July 30, 1935.　　　　J. L. SHROYER　　　　2,009,791
COOKING APPARATUS
Filed Dec. 4, 1931　　　2 Sheets-Sheet 2
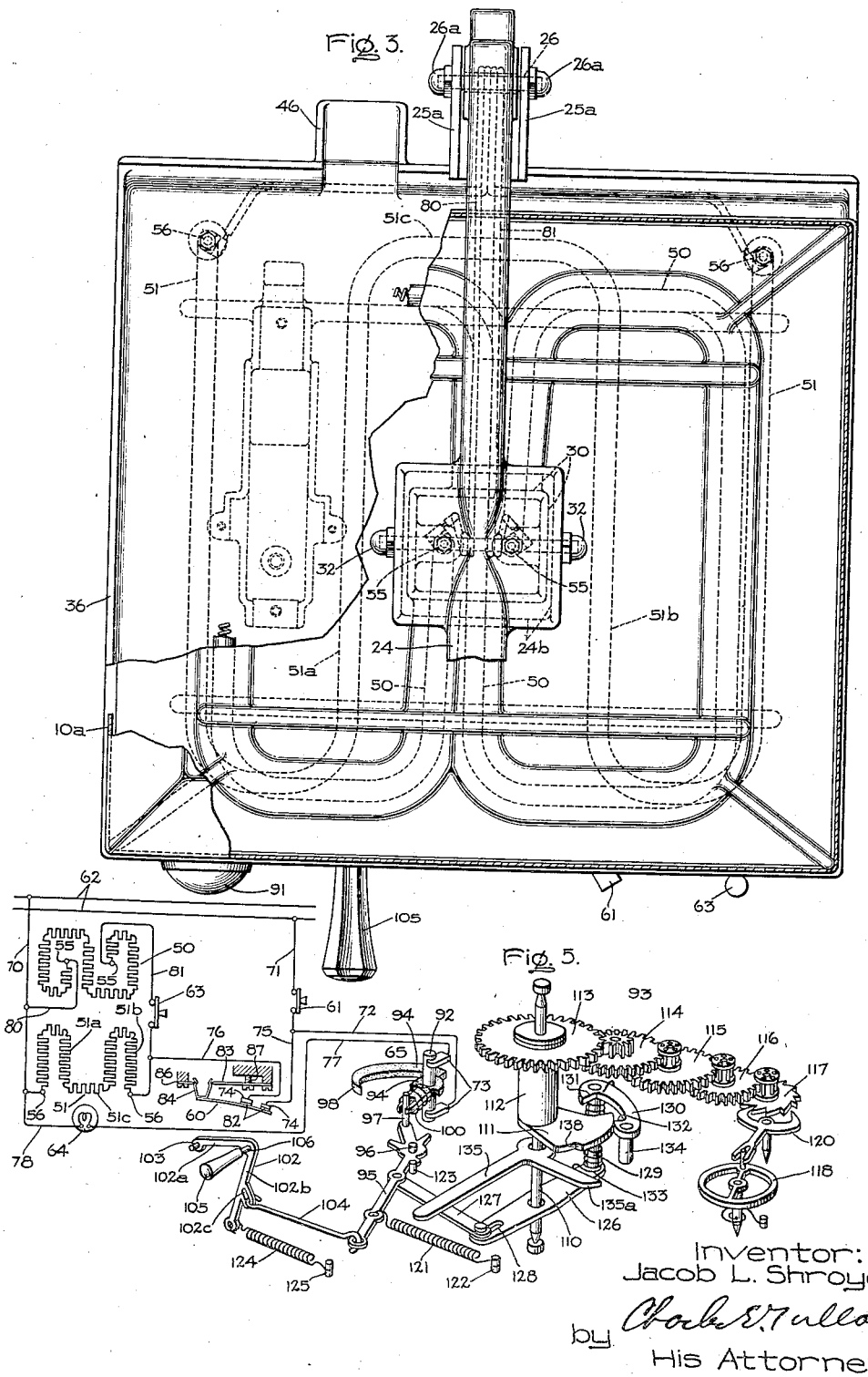
Inventor:
Jacob L. Shroyer,
by Charles E. Tulla
His Attorney.

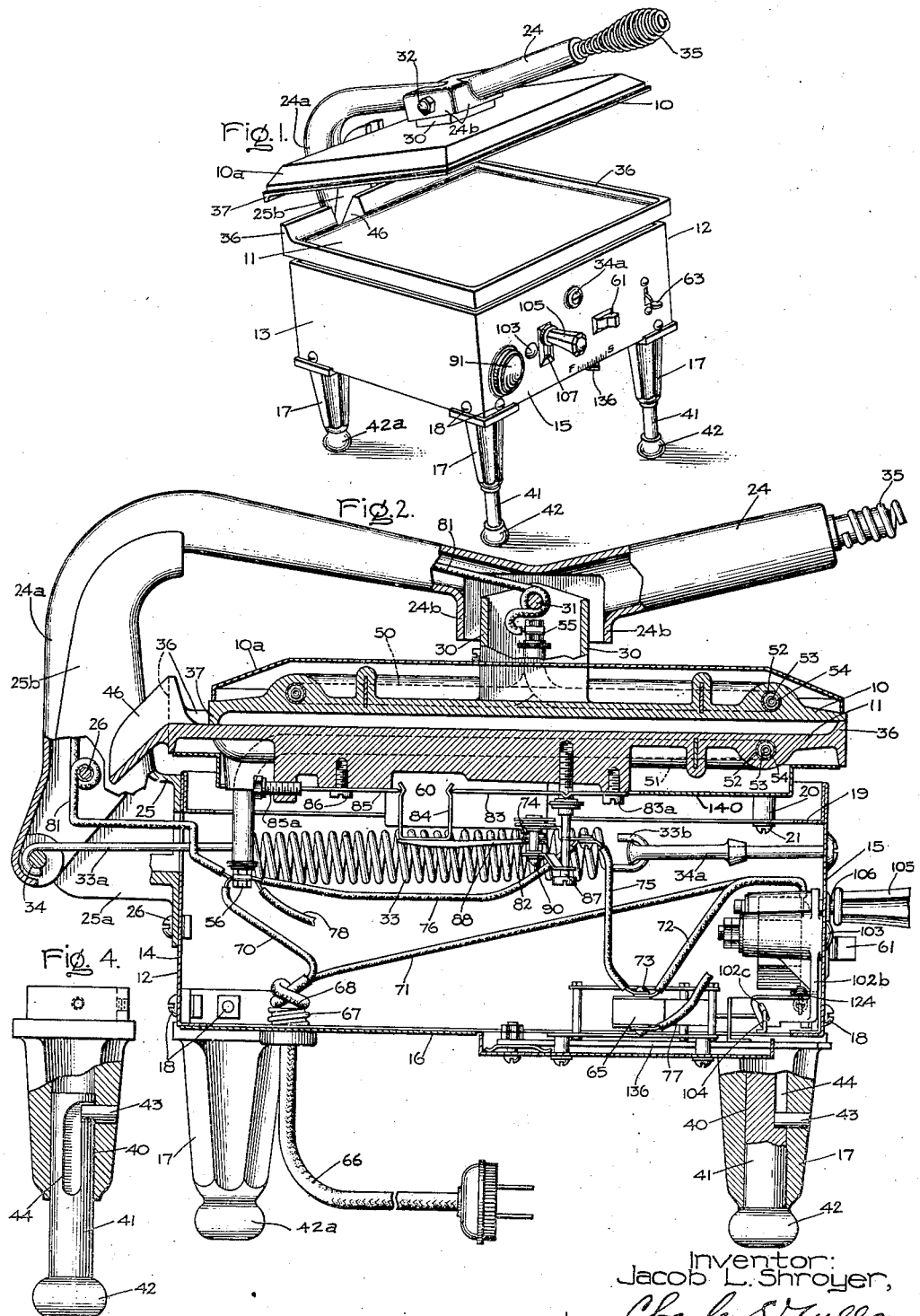

Patented July 30, 1935

2,009,791

UNITED STATES PATENT OFFICE 2,009,791

COOKING APPARATUS

Jacob L. Shroyer, Oak Park, Ill., assignor to Edison General Electric Appliance Company, Chicago, Ill., a corporation of New York Application December 4, 1931, Serial No. 578,857

7 Claims. (Cl. 219—19)

My invention relates to cooking apparatus, more particularly to cooking apparatus provided with separable cooking plates, and has for its object the provision of an improved device of this character.

My invention has special application to cooking apparatus provided with opposed and separable electrically heated cooking plates, and has for a further object the provision of means whereby the utility of the apparatus is increased and its functions extended. More specifically, my invention contemplates the provision of electric cooking apparatus of this character for effecting in an efficient and economical manner such cooking operations as toasting, baking, etc., and further, the provision of means whereby the apparatus can also be conveniently used for such operations as broiling and the like.

In carrying my invention into effect in one form thereof, I provide suitable means for supporting the opposed heating plates whereby they can be moved from substantially horizontal cooking positions to cooking positions arranged at an angle to the horizontal. It is contemplated that the plates will be arranged in their horizontal positions when it is desired to use the apparatus to toast bread or sandwiches, to bake pancakes, or to perform similar cooking operations, whereas when it is desired to broil steaks, bacon or other meats, the apparatus will be arranged with the plates in their inclined positions so that excess grease and juices from the meat can readily drain off from the cooking plates.

I further provide a suitable operating arm attached to one of the cooking plates whereby it can be moved with respect to the other plate, and will always position itself parallel with the latter plate regardless of the thickness of the edibles placed between them and regardless of which of the cooking positions they happen to be in.

The operating arm is provided with a passageway through which the electrical conductors for the heating element of its attached plate are passed, whereby these conductors are concealed and protected from foreign matters, such for example as grease.

For a more complete understanding of my invention reference should be had to the accompanying drawings, in which Fig. 1 is a perspective view of electric cooking apparatus embodying my invention; Fig. 2 is a vertical central sectional view of the cooking apparatus of Fig. 1, portions being broken away so as to illustrate certain structural details; Fig. 3 is a plan view partly in section and with portions broken away so as to illustrate certain structural details; Fig. 4 is an elevation partly in section of a certain leg structure used in connection with my cooking apparatus; and Fig. 5 is a diagrammatic view illustrating heating circuits for the cooking apparatus, together with certain control mechanisms for the heating circuits.

Referring to the drawings, I have shown my invention in one form in connection with electric cooking apparatus comprising upper and lower cooking or heating plates 10 and 11. The upper plate preferably will be provided with a casing or cover member 10a.

These heating plates 10 and 11 are supported on a base 12 comprising walls defining a rectangular closed casing. As shown, this casing has a pair of side walls 13, an end wall 14, a front wall 15 and a bottom wall 16, these walls preferably being formed from a suitable sheet metal, such as steel. The base 12, as shown, rests on a plurality of legs 17 forming supports for the cooking apparatus. The legs are secured to the base by any suitable means, such as screw adjusting means 18.

The side, end and front walls of the base preferably will be formed into an integral structure; and, as shown, the upper edges of these walls are folded inwardly upon themselves (Fig. 2), the lower ends of the folded portions being extended horizontally into the casing so as to form a peripheral, horizontal flange 19. This flange or ledge 19 serves to support the lower heating plate 11, this plate resting on sleeves or collars 20 which in turn rest upon the flange. The sleeves 20 receive suitable screws 21 which are passed through apertures provided for them in the flange 19 and which have threaded connections with the plate 11. The upper plate 10 rests directly on the lower plate 11. The upper plate, as shown, is attached to a suitable operating arm 24 which is pivotally attached to the base 12. As shown, a suitable hinge bracket 25 is secured as by means of screw fastening means 26 to the rear wall 14 of the casing 12. This bracket is provided with a pair of spaced supporting members 25a, through which members a pivot pin 26 on which the arm 24 is pivotally mounted is passed and supported; the arm 24, as shown, extends transversely over the heating plate and is provided with a portion 24a arranged substantially at right angles to the transverse portion, the lower end of this projecting portion being pivotally secured to the pin 26. This pin may be secured in any suitable manner, as by means of retaining nuts 26a.

The upper plate 10 is pivotally attached to the transverse portion of the arm 24 at substantially its central portion. As shown, the arm 24 is of tubular form, the arm being provided with a passageway extending throughout substantially its full length. This passageway at substantially the central portion of the transverse portion of the arm 24 opens toward the upper surface of the plate 10. The walls 24b of the arm at this central portion are extended laterally somewhat so as to enlarge the opening and give it a substantially rectangular shape, the walls as shown depending from the arm in flange-like form. It is to these depending flange-like walls that the upper heating plate 10 is pivotally connected. For this purpose the plate 10 is provided with walls defining a substantially rectangular hinge or bearing member 30 extending upwardly from its upper face and proportioned to be received within the depending walls 24b of the operating arm. Extending laterally through the walls 24b of the arm 24 and also through the side walls of the bearing member 30 is a suitable pivot pin 31 secured in any suitable manner as by means of nuts 32 threaded on its ends. It will be observed that the member 30 is somewhat smaller in length than is the opening provided for it in the hinge arm 24 so as to provide for considerable pivotal motion of the upper plate relative to its supporting arm 24.

The hinge bracket 25, as shown, has an upwardly extending portion 25b of channel shape and the general contour of the adjacent surface of the arm 24. This member 25b serves as a stop for the upper heating plate when the latter is in its completely opened position.

The hinged portion 24a of the operating arm 24, as shown, extends downwardly somewhat beyond the pivot pin 26. To the end of this extending portion is secured a suitable counterbalancing spring 33. As shown, one end 33a of this spring is attached to a spring stud 34 attached to the lower end of the portion 24a, while the other end 33b of the spring is attached to an adjusting bolt 34a passed through and supported by the front wall 15 of the base. It will be observed that this wall is provided with a head readily accessible to the attendant whereby adjustments in the tension of the spring 33 can be conveniently effected. It will be understood that the tension of the spring, will be adjusted to counterbalance the weight of the operating arm 24 and also the upper heating plate 10 so as to assist the attendant in opening and closing the plate. The rear wall 14 of the base is provided with a suitable aperture through which the end 33a of the spring is passed to the arm 24. The arm 24 is provided with a suitable spring handle 35.

The lower plate 11 preferably is provided with a peripheral flange 36. The upper plate 10 is arranged to rest on the side and front portions of this flange. The rear portion of the upper plate is itself provided with a depending flange 37 which rests on the heating surface of the lower plate 11. It will be observed that these cooperating flanges define a heating space between the plates 10 and 11 when the latter are closed, and that the flanges cooperate to provide a retaining wall for the edibles placed between the plates. The heating plates preferably will be provided with smooth uninterrupted heating surfaces which when the plates are closed are substantially parallel with each other.

It is contemplated that the heating apparatus will be used for a number of cooking operations. When the plates 10 and 11 are arranged in a horizontal position, as is shown in Fig. 2, sandwiches or bread may be placed between them for toasting operations. Moreover, the upper plate may be elevated so that pancakes can be baked on the lower surface or numerous other like cooking operations be effected.

For broiling purposes it is sometimes desirable to incline the heating plates somewhat so that excess grease and juices from the meat may be readily drained from the heating surfaces of the plates. For this purpose I have provided the front legs 17 of the device with extensions whereby the lengths of these legs can be increased to tilt the heating apparatus toward the rear. As shown, these front legs 17 are provided with vertically arranged bores 40. Within these bores and arranged to slide therein are suitable extension members 41. The lower ends of the extension members 41 are provided with enlarged portions or heads 42 arranged to conform the appearance of the front legs with those at the rear, which, as shown, have similar heads 42a, and also to serve as stop members defining the extreme retracted position of the extension members. It will be understood that when these members 41 are in their retracted positions, the lengths of the front legs will be substantially equal to those of the rear legs so that the plates 10 and 11 will be supported in a substantially horizontal position.

Suitable means are provided for locking the members 41 in their extended positions so that the plates 10 and 11 can be securely supported in inclined positions, as shown in Fig. 1. This locking means comprises suitable locking pins 43 which as shown in Figs. 2 and 4 are secured to the legs 17 so as to project into the vertically arranged bores 40. The projecting portions of these pins are received in vertically arranged slots 44 provided in the extension members 41. As shown in Fig. 4, the upper end of each slot 44 is curved at substantially right angles to the remaining vertical portion of the slot. It will be observed, therefore, by reason of this slot arrangement that the members 41 can be withdrawn from their bores 42 and that by giving them a quarter turn the pins 43 will be brought into the upper horizontal portions of the slots 44, whereby it will be impossible for the members to be moved to their retracted positions until they are again turned to bring the pins into the vertical portions of the slots. Preferably, the lower walls of the horizontal portions of the slots 44 will be formed on an arc having a radius substantially equal to the radius of the locking pins so that when the pins are received in these portions the extensions 41 will be securely locked in their extended positions.

It will be observed that by reason of the above described construction in order to move the plates 10 and 11 to their inclined position, it is merely necessary to withdraw the extension portions 41 and then give them a quarter turn to move the locking pins into their locking portions of the slots 44. To return the plates to their horizontal positions it is merely necessary to give the extension members a quarter turn in the opposite direction to release them from the pins, the slot 44 then receiving the pins to allow the members 41 to be returned to their retracted positions.

Preferably, the rear wall of the flange 36 provided on the lower plate 11 will be provided with an opening terminating in downwardly extending lip or spout 46 defining a drain for excess grease and juices from the meats arising during the broiling operations. It will be observed that when the plates are in their inclined positions for broiling operations, the excess in grease and juices will flow toward the rear of the plates where it will pass through the spout 46 to any suitable receptacle (not shown) which may be placed thereunder for receiving the grease and juices.

The cooking plates 10 and 11 preferably are cast from a suitable metal having a good heat conductivity, such as aluminum, and are heated by means of electrical heating elements 50 and 51 respectively which as shown are cast in the metal forming the plates. While any suitable electrical heating elements may be used, I prefer to use a sheathed element, such as described and claimed in United States Patent No. 1,367,341, granted to C. C. Abbott, dated February 1, 1921. Briefly, this element comprises an outer metallic sheath 52 (Fig. 2) in which a helically shaped resistance wire 53 is embedded in a compacted, powdered, heat refractory, electrically insulating material 54, such as magnesium oxide. It will be understood that these units can be bent easily into any desired shape.

As shown (Figs. 3 and 5), the heating element for the upper plate 10 is formed substantially in S-shape extending transversely of the plate. The end portions of this heating element are curved inwardly, as shown, and are connected to suitable terminal members 55 arranged at the central portion of the plate. Preferably, the extreme end portions of the element 50 will be turned upwardly at right angles to the element, as shown in Fig. 2, so as to be embraced by the walls of the pivot member 30.

The lower heating element 51 is formed in a pair of U-shaped loops 51a and 51b connected by a transverse portion 51c, as clearly shown in Figs. 3 and 5. The extreme end portions of this lower heating element are turned downwardly substantially at right angles to the body of the element and project into the casing 12 where suitable terminals 56 are provided.

It will be observed that the heating elements are arranged to heat their plates 10 and 11 substantially uniformly over their cooking surfaces. This is rather important in connection with the type of heating apparatus shown in that all particles of the edibles placed between the plates will receive substantially the same degree of heat.

Preferably the heating element 51 for the lower plate will have a capacity slightly higher than that of the upper heating element so as to compensate for the heat losses by conduction from the lower plate. This difference in capacity will be such that the plates will be maintained at substantially the same temperature.

The heating elements 50 and 51 are provided with suitable control means whereby substantially constant temperatures are maintained in the heating plates, and further, whereby the periods of the various cooking operations can be readily measured. These control means preferably will be substantially the same as those described and claimed in my copending application Serial No. 529,654, filed April 13, 1931.

The control for these heating elements includes a temperature responsive device 60 and a main control switch 61 disposed in the connections leading from a suitable source of electrical supply 62, shown diagrammatically in Fig. 5. An auxiliary switch 63 is arranged in the connections provided for the upper heating element 50 whereby the latter may be cut out of the heating circuit independently of the lower heating element 51. In order to measure the cooking periods, preferably in accordance with the temperatures maintained in the cooking plates, a suitable signal device comprising a pilot lamp 64 and a time element controlling switch 65 therefor are provided.

The heating elements 50 and 51 are connected in parallel, as shown, diagrammatically in Fig. 5, and connected in parallel with these elements is arranged the pilot lamp 64. External electrical connections for the two heating elements and pilot lamp shown as a twin supply conductor 66 are brought in at the lower wall 16 of the casing 12 through a bushing 67 formed of a suitable electrically insulating material, such as porcelain. As shown, a knot 68 is formed in the cord above the bushing to prevent any possibility of damage or strain to the mechanism within the casing as by accidentally pulling on the cord.

One conductor 70 of this twin supply conductor is connected directly with one of the terminals 56 of the lower heating element, while the other conductor 71 of the supply conductor is connected to one terminal of the main control switch 61. This switch preferably will be of the toggle type and will be mounted within the casing and on its front wall 15. The operating member of this switch is passed through a suitable aperture provided for it in the front wall of the casing to the exterior of the casing where it may be conveniently operated. The other terminal of the toggle switch 61 is connected by means of a conductor 72 to one of a pair of fixed contacts 73 provided on the time switch 65 and from this contact to one of a pair of fixed contacts 74 provided on the thermostat 60 by means of a conductor 75. The other fixed contact 74 of the thermostat is connected by means of a conductor 76 with the second terminal 56 of the lower heating element 51. The remaining fixed contact 73 of the time switch 65 is connected by means of a conductor 77 with one side of the pilot lamp 64. The other side of this lamp is connected with the first terminal 56 of the lower heating element by means of a conductor 78. The two heating elements 50 and 51 are connected in parallel by means of a pair of conductors 80 and 81 which are passed between the heating plates and are electrically connected with the terminals 55 and 56.

It will be observed that by reason of the foregoing electrical connections, the two heating elements 50 and 51 are connected in parallel, and the pilot lamp 64 is connected in parallel with the heating circuit. It will also be observed that the heating elements are controlled by means of a thermostat 60 independently of the signal lamp circuit, while the signal lamp circuit is controlled by the timing switch 65 independently of the heating circuit; and also that the toggle switch 61 is arranged to control both of the energizing circuits provided for the heating elements and pilot lamp.

The temperature responsive device 60 for controlling the heating elements 50 and 51 to maintain substantially constant temperatures in the heating plates 10 and 11, preferably will be of the form described and claimed in the United States Patent No. 1,743,073, granted to A. H. Simmons, dated January 7, 1930, although it will be understood that any other suitable thermostat may be used. Briefly, this thermostat comprises the above-mentioned fixed contacts 74, a pair of movable contacts 82 for bridging the fixed contacts and a bi-metallic temperature responsive element 83 for actuating the movable contacts. The bi-metallic bar 83, as shown, is rigidly secured at one end by means of a screw 83a to the lower surface of the bottom plate 11 and extends crosswise of the plate and in substantially parallel relation with it. The free end of the thermostat bar bears on one arm of a U-shaped spring member 84, the other arm of which is seated on a fixed knife-edge bearing 85, which bearing is secured in any suitable manner, as by means of a screw 86, to the under surface of the heating plate. A temperature adjustment rod or shaft 87 is provided to cooperate with the thermostat bar 83 whereby the temperature maintained in the heating plates can be varied. An adjustment screw 85a for changing the tension in the spring member 84 is provided whereby the range between the maximum and minimum temperatures at which the circuit through the thermostat is opened and closed can be adjusted.

Secured to the central portion of the spring member 84 is a spring contact member 88 on the free end of which are carried the bridging contacts 82. As shown, the bridging contacts cooperate with the fixed contacts 74 so that when the contacts are in engagement the electrical circuit through the thermostat is closed, whereas when the contacts are out of engagement, the thermostat is opened. A suitable stop member 89 is provided for the bridging contacts when in their open circuit position.

It will be understood that the U-shaped spring member 84 serves to snap the thermostat bar 83 quickly between its two operating positions and thus to quickly open and close the switch.

The arm 24, as has been pointed out, serves to conceal and protect the conductors 80 and 81 passed between the heating plates 10 and 11. As shown, these conductors are passed from the base 12 to the pivot pin 26 about which they are coiled. One or more turns of the conductors will be formed about this pin. Preferably and as shown the pin will be covered with a sleeve formed of a suitable electrically insulating material, such as porcelain. From this pin the conductors are passed through the arm 24 to the pivot pin 31 about which they are also coiled. From this pin they are directed to the terminals 55 of the upper heating element to which they are secured. It will be observed that the conductors 80 and 81 are not only concealed and protected by the arm 24 but also are secured at a plurality of points, viz., the pivot pins 26 and 31, whereby they are protected against excessive strains.

In the operation of the heating devices thus far described, it will be understood that the bridging contacts 82 are held in engagement with the fixed contacts 74 to maintain the heating circuits closed as long as the temperature of the heating plates 10 and 11 are below a predetermined maximum value. Upon the occurrence of a predetermined maximum temperature the thermostat moves the contacts quickly apart to open the heating circuit. After the heating circuit has been opened and the temperature of the heating plates, and consequently the temperature of the thermostat, begins to decrease, the thermostat bar will tend to move back to its closed position until finally upon the occurrence of a predetermined minimum temperature, the thermostat will snap to quickly close its switch contacts. In this manner the heating circuits are controlled so as to maintain a predetermined heating plate temperature which is a mean between the maximum and minimum temperatures for which the thermostatic device is set to operate. If the lower plate only is being used the thermostat will operate in the same manner to maintain a substantially constant cooking temperature.

The signal lamp 64 of the time controlled signal means for measuring cooking periods is mounted in the casing 12 behind the front wall 15 in any suitable manner, and in the wall is provided an aperture for receiving a suitable glass lens 91 arranged in front of the lamp and which preferably will have some suitable color, such as red.

The timing switch 65 for controlling the pilot lamp, as shown, is supported on the bottom wall 16 of the casing 12. This switch comprises the above mentioned fixed switching contacts 73, cooperating bridging contacts 92 for controlling an electrical circuit through the switch and a timing clockwork mechanism 93 controlling the motion of the bridging contacts 92.

The bridging contacts 92 are mounted on a suitable insulating supporting member 94 which is carried on one end of an arm 95 pivotally mounted on a fixed pivot member 96. The member 94 is forked at one end to receive an actuating pin 97 mounted on one end of the arm 95, and is biased away from the pin toward an insulating stop and guide member 98 by means of a suitable compression spring 100. The stop member, as shown, is curved at one end, its left-hand end, so as to provide a stop for the bridging contacts 92 when they are in their open circuit position. This member is also curved so as to guide the contacts 92 to the fixed contacts 73. It will be observed that the mechanism thus far described constitutes a toggle switch which operates to its open and closed circuit position with a snap action.

The switch is opened manually by means of an operating member 102. This member, as shown in Fig. 5, is of annular form so as to provide two lever arms 102a and 102b, as diagrammatically shown in Fig. 5. The end of the arm 102a is fixedly pivoted by means of a pin 103 to the front wall 15 of the casing; the other arm 102b is connected, preferably at a point intermediate its ends, to the free end of the lever 95 by means of a link 104. The operating member 102 is provided with a handle 105 accessible on the exterior of the casing whereby the attendant can conveniently operate the switch. This handle, as shown, is connected to the lever 102 by means of a pin 106 (Fig. 2) passed through a vertical slot 107 (Fig. 1) provided for it in the front wall of the casing.

The bridging contacts 92 are moved to their closed circuit position a predetermined interval of time after they have been moved to their open circuit position by means of the clockwork mechanism 93 which is rendered effective by the operation of the lever 102 in opening the switch. In other words, the lever 102 performs two functions, viz., to operate the switch to its open circuit position and at the same time to render the timing mechanism effective to thereafter close the switch.

The timing mechanism comprises a timing spindle 110 on which is mounted a cam 111. This cam is formed with a sleeve 112 bearing on the timing spindle to provide a friction connection therewith whereby under certain conditions of operation the cam may be rotated independently of the spindle, while under certain other conditions of operation it will be rotated with the spindle. Mounted on the spindle to rotate with it is a gear 113; this gear is connected through a gear train comprising gear wheels 114, 115 and 116 with the ratchet 117 of a suitable escapement mechanism. This mechanism, as shown, further comprises a balance wheel 118 and an escapement 120, the arms of which cooperate with the escapement teeth of the ratchet 117.

The energy for driving the clockwork mechanism is provided by means of a spring 121. This spring is a tension spring having its one end connected to the lever 95 intermediate its pivot and the end which is connected to the lever 102 and its other end connected with a member 122 fixed to the casing. This spring member, as viewed in Fig. 5, biases the lever arm 95 in a counter-clockwise direction, toward a suitable stop 123. A second tension spring 124 is arranged to operate the lever 102 in a counter-clockwise direction under certain conditions of operation, as will be pointed out hereinafter in more detail. This spring has one end connected with the lower end of the lever arm 102b and its other arm connected with a fixed member 125.

The mechanical connection between the common operating lever 102 and the clockwork mechanism comprises a lever 126 rotatably mounted on the winding spindle 110. One end of this lever is connected by means of a link 127 with the switch lever 95 at a point between the pivot 96 and the point of connection of the spring 121; this link 127 preferably will be connected with the member 126 by a slotted connection 128 providing for limited movement of the connected end of the link longitudinally of the lever 126.

Mounted on the other end of the lever 126 is an upright pin 129 on the upper end of which is rotatably mounted a pawl-like member 130 arranged at its opposite ends with teeth 131 and 132. These teeth cooperate with the cam 111. As shown, the pawl-like member 130 is biased in a clockwise direction, as viewed in Fig. 5, that is, in a direction toward the cam, by means of a suitable coiled spring 133 mounted on the pin 129. The pawl member, as shown, is provided on its free end with a depending pin-like member 134. A suitable adjustable lever 135 is arranged on an axis substantially coincident with the axis of the timing spindle 110 and is provided with an arm 135a to cooperate with the pin-like member 134 to adjust the timing periods, as will be more fully explained hereinafter.

The timing adjustment lever 135 is provided with an operating lever 136 (Fig. 2) pivotally mounted on the bottom wall of the casing 12 at a point back of the timing mechanism; this lever is extended so as to project forwardly of the front wall 15 whereby it is accessible on the exterior of the casing. This lever is connected in any suitable manner (not shown) to the lever 135 whereby movement of the operating lever moves the lever 135 in a corresponding direction. It will be observed that by reason of this arrangement a relatively small arcuate movement of the lever 136 will impart a considerably larger arcuate movement to the member 135. This is of advantage in that it is desirable that the control arm accessible to the attendant have a comparatively small range of movement.

In the operation of the timing mechanism, when the common operating member 105 provided for the contacts and clockwork mechanism is depressed the lever arm 102 will be rotated in a clockwise direction, as viewed in Fig. 5, which operation moves the lever 95 in a clockwise direction; this operation causes the toggle switch to snap to its left-hand position to open the switch; this operation also moves the lever 126 in a clockwise direction whereby the tooth 131 of the pawl 130 engages the cam 111 and moves it in the same direction. As the arm 126 and pawl 130 are thus moved, the spring 133 operates to move the pawl in a clockwise direction on its pin 129 so that the tooth 132 falls behind a detent 138 provided on the cam. It will be understood that during this clockwise motion of the cam the sleeve 112 will rotate on the winding spindle 110, the latter being stationary.

The depressing movement of the handle 105 also tensions the springs 121 and 124 which thereafter will tend to return the various elements to their initial positions, shown in Fig. 5. The force exerted by the spring 124 tends to return the lever 102 to its upper position, while the force exerted by the spring 121 is transmitted to the link 127 and the arm 126 whereby the latter tends to rotate in a counter-clockwise direction. Motion in this direction, however, is retarded by the timing mechanism by reason of the fact that the tooth 132 of the pawl member 130 in engaging the detent 138 locks the lever 126 with the timing mechanism through the cam 111; it will be understood that during this operation the frictional force between the spindle 110 and the sleeve 112 will be sufficient to lock the spindle and sleeve together. The timing mechanism will thus operate until the pin 134 of the pawl engages the arm 135a of the time adjusting lever 135. When this occurs the pawl will be moved outwardly to disengage the cam whereby the arm 126 will be released and then quickly moved in a counter-clockwise direction to its initial position by the tension spring 121. This operation snaps the bridging contacts 92 to their closed circuit position, and the operating member 102 is returned by the spring 124 to its initial position with its operating member 105 at the upper end of its slot 107. By reason of the slot 102c (Figs. 2 and 5) between the arms 102b and the link 104, the return movement of the arm 102 to its initial position does not interfere with the movement of the arm 95. It will be understood that the above described operation may be repeated as often as is desired merely by depressing the operating handle 105.

To effect an adjustment of the timing periods, it is merely necessary to move the lever 136 which in turn moves the lever 135 to adjust the position of the stop arm 135a. Obviously, the adjustment of this stop arm controls the length of time that the clockwork mechanism will operate before the pin 134 engages the stop; consequently the adjustment of the stop arm controls the period of time that the switch will remain open after it has been moved to its open position by the operation of the handle 105.

The pilot lamp and likewise the conductors and switch mechanism are protected from excessive temperatures by means of a shield 140 interposed between them and the cooking plate 11. This shield will be supported by the sleeves 20 on which the lower plate rests.

In the operation of the heating apparatus it will be understood that for toasting and like operations, the heating plates 10 and 11 will be supported in their substantially horizontal positions. It will be assumed that it is desired to toast sandwiches in the apparatus and that the apparatus is cold. The toggle switch 61 will be operated to connect the heating elements and the pilot lamp circuits with the source of electrical supply, it being assumed that the twin supply conductor 65 is plugged into a suitable supply plug. In view of the fact that the apparatus is cold the thermostat 60 will be closed to complete the energizing circuit for the heating elements; at this time the contacts of the timing switch also will be closed so as to complete an energizing circuit for the pilot lamp 64. Under these conditions the resistance elements 50 and 51 will begin to heat up the plates and the pilot lamp will be lighted. Eventually the heating plates will be heated to the maximum temperature for which the thermostat is set to open the heating circuit, whereupon the thermostat will open this circuit; the thermostat will then operate in the manner previously described to maintain a substantially constant predetermined temperature in the cooking plates. The apparatus is then in condition to be used.

The upper plate 10 will be elevated by means of the handle 35 and the sandwiches will be placed upon the heating surface of the lower plate 11 after which the upper plate will be moved to its closed position. It will be understood that by reason of the pivotal connection between the upper plate and its operating arm 24, the upper plate will move into a position substantially parallel with the lower plate irrespective of the thickness of the sandwiches placed between them. The arm 105 will then be depressed. This operation of the arm will open the pilot lamp energizing circuit indicating that the cooking period has started, and will also render the timing mechanism effective to close the switch a predetermined interval of time thereafter. Upon the expiration of this period of time the timing switch will operate to close the pilot lamp circuit whereby the lamp will be lighted thereby indicating that the toasting period has been completed. It will be understood that the timing mechanism will be adjusted by its lever 136 in accordance with the heating plate temperature maintained by the thermostat so as to insure a completely toasted product. After the attendant has been signalled that the toasting period has been completed, the upper plate will be elevated and the sandwiches removed. After this another batch of sandwiches may be toasted in the manner described, the toasting period as before being measured by the timing mechanism.

It may be that the cooking operations will require only the use of the lower heating plate 11. Thus, if it be desired to bake pancakes, it will be unnecessary to utilize the upper heating plate 10. For such operations, the upper heating plate 10 will be elevated and moved against the stop 25b, and the switch 63 controlling the heating element 50 of the upper plate will be thrown so as to open the heating circuit for this element. Otherwise, the operation of the apparatus will be substantially as that described; the thermostat 60 will maintain a substantially constant cooking temperature in the plate 11 and the timing mechanism will operate as before to measure the cooking periods.

For broiling and like cooking operations it is usually desirable to elevate the front of the apparatus by means of the extensions 41 provided on the front legs 17. For broiling and such operations the apparatus will be used in the manner previously described for the toasting and baking operations with the exception that the device will be tilted toward the rear. Assuming that the cooking plates 10 and 11 have been heated to the desired temperature, the upper plate will be elevated and the meat or other substance to be broiled will be placed on the lower heating surface, after which the upper plate will be returned to its cooperating position with the lower plate. By reason of the pivotal connection between the upper plate 10 and its operating arm 24 the plate again will parallel itself with the lower plate in spite of the fact that the apparatus is tilted toward the rear. During the broiling operations excess grease and juices from the meat will drain toward the rear of the cooking plates from which they will be drained through the drain spout 46. When the meat has been broiled for a predetermined length of time, which period will have been set by the setting of the timing device, the pilot lamp will be lighted indicating to the attendant that the cooking operation has been completed. Whereupon, the attendant will elevate the upper plate and remove the edible which has been cooked.

It will be understood that for any of the cooking operations the thermostat will operate to maintain the heating plate or plates at a substantially constant temperature so that each operation may be repeated, one after the other, without reheating the cooking plate or plates. It will be further understood that by reason of the time element signal means for measuring the cooking periods, a uniformly cooked product can be obtained, each respective cooking operation being a substantial duplicate of the preceding cooking operations.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desired to secure by Letters Patent of the United States, is:

1. Cooking apparatus comprising a pair of opposed heating plates, electrical heating means for said plates, a base supporting said plates, a supporting arm for the upper of said plates, means pivotally connecting said arm to said base, means pivotally connecting said arm to said upper plate and electrical conductors between said base and said upper plate, terminals for said heating means of said upper plate adjacent said means pivotally connecting said arm to said upper plate, said arm being provided with a closed passageway enclosing said conductors and directing them to said terminals.

2. Cooking apparatus comprising a base, a cooking plate fixed to said base, a second cooking plate cooperating with said first cooking plate, electrical heating means carried by said plates arranged to apply heat thereto, a closed tubular hollow arm for operating said second plate pivoted to said base, pivotal means connecting said second plate with said operating arm, a spring member connected to counterbalance the weight of said operating arm and said second plate, electrical conductors passed through said hollow arm to the heating means of the plate attached to said arm and means securing said electrical conductors at a plurality of points in said hollow arm so as to prevent movement of the portions of said conductors between said secured portions longitudinally of said arm.

3. Cooking apparatus comprising a pair of opposed heating plates, a pivoted hollow supporting arm for one of said plates arranged to move said plate relative to said other plate, means pivotally connecting said arm to said one plate, electrical heating means for said movable plate, electrical supply conductors for said heating means directed through said hollow arm to said movable plate, and walls carried by said arm and said movable plate cooperating to define a substantially closed passageway for said conductors where they pass from said arm to said plate.

4. Cooking apparatus comprising upper and lower heating plates, walls on said upper plate defining a hollow hinge bracket, a hollow supporting arm for said upper plate provided with an aperture opening to said hinge bracket and with walls surrounding said aperture and cooperating with said hinge bracket to define a substantially closed passageway between said hollow arm and said upper plate, means pivotally connecting said walls on said plate to said walls on said arm, an electrical heating element for said upper plate having terminals within said hollow hinge bracket and electrical supply conductors for said heating element directed through said hollow arm and said passageway to said terminals.

5. Cooking apparatus comprising upper and lower heating plates, an electrical heating unit carried by each of said plates, the terminals for the heating unit of the upper plate extending upwardly from substantially the central portion of said plate, walls on said plate surrounding said terminals, a base for said plates, a hollow arm pivotally secured to said base and having a portion extending over said upper plate, said hollow arm being provided with an aperture opening to the upper surface of said upper plate substantially at its central portion, downwardly extending walls on said arm surrounding said opening and the walls on said upper plate so as to provide a substantially closed passageway between said arm and said upper plate, pin means pivotally connecting the walls on said arm with the walls on said upper plate, and electrical connections for said upper plate heating element directed from said base through said hollow arm and said passageway defined by said walls to the terminals of said element.

6. An electric cooking apparatus having a frame, upper and lower heating elements, a hollow supporting arm pivoted to said frame, a pivot support extending upwardly from said upper heating element, a pivot for connecting said support and arm, and conducting wires leading to said upper heating element and passing within said hollow arm and pivot support.

7. Cooking apparatus comprising a pair of opposed cooking plates, electrical heating means carried by said plates, a base for said plates, legs attached to said base at the front and rear arranged to support said base with said cooking plates in a substantially horizontal position, the legs at the rear having enlarged heads fixed on their lower ends, and those at the front being provided with vertically arranged bores, extension members within said bores arranged to be moved outwardly thereof to increase the effective lengths of said legs so as to support the front edges of said plates in an elevated position to incline said plates for broiling and like operations, means for locking said extension members in their withdrawn positions, and enlarged heads on the lower ends of said extension members arranged to engage said legs at the front so as to define the extreme retracted positions of said extension members in said bores and arranged when in said retracted positions to simulate the enlarged heads fixed on the lower ends of said legs at the rear.

JACOB L. SHROYER.